United States Patent
Craig

(10) Patent No.: US 7,138,011 B2
(45) Date of Patent: *Nov. 21, 2006

(54) SURFACE TREATED PIGMENTS

(75) Inventor: Daniel H. Craig, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/935,001

(22) Filed: Sep. 7, 2004

(65) Prior Publication Data

US 2006/0048678 A1 Mar. 9, 2006

(51) Int. Cl.
C09C 3/08 (2006.01)
C09C 1/36 (2006.01)

(52) U.S. Cl. ............... 106/499; 106/447; 106/504; 106/505

(58) Field of Classification Search ........... 106/417, 106/420, 421, 429, 432, 440, 447, 452, 453, 106/460, 461, 465, 487, 491, 499, 504, 505; 428/402, 403
See application file for complete search history.

(56) References Cited

U.S. PATENT DOCUMENTS

| | | | |
|---|---|---|---|
| 3,015,573 A | 1/1962 | Myers | |
| 3,172,772 A | 3/1965 | Rowe | |
| 3,506,466 A | 4/1970 | Bramekamp | |
| 3,728,142 A | 4/1973 | Rudolph | |
| 3,754,956 A | 8/1973 | Durrant | |
| 3,825,438 A | 7/1974 | Pritchard | |
| 3,925,095 A | 12/1975 | Bockmann | |
| 3,947,287 A | 3/1976 | Belde | |
| 4,056,402 A | 11/1977 | Guzi | |
| 4,127,421 A | 11/1978 | Ferrill | |
| 4,156,616 A | 5/1979 | Dietz | |
| 4,183,843 A | 1/1980 | Koenig | |
| 4,186,028 A | 1/1980 | Woditsch | |
| 4,209,430 A | 6/1980 | Weber | |
| 4,235,768 A | 11/1980 | Ritter | |
| 4,357,170 A | 11/1982 | Brand | |
| 4,375,520 A | 3/1983 | Pennie | |
| 4,375,989 A | 3/1983 | Makinen | |
| 4,377,417 A | 3/1983 | Brand | |
| 4,464,203 A | 8/1984 | Belde | |
| 4,563,221 A | 1/1986 | Humphreys | |
| 4,599,114 A | 7/1986 | Atkinson | |
| 4,741,780 A * | 5/1988 | Atkinson | ............... 106/448 |
| 4,752,340 A | 6/1988 | Brand | |
| 4,762,523 A | 8/1988 | Gawol | |
| 4,863,800 A | 9/1989 | Miyoshi | |
| 4,909,853 A | 3/1990 | Weinkenhover | |
| 4,923,518 A | 5/1990 | Brand | |
| 4,935,063 A | 6/1990 | Costanzi | |
| 4,986,853 A | 1/1991 | Kieser | |
| 5,228,912 A | 7/1993 | Herget | |
| 5,260,353 A | 11/1993 | Palmer | |
| 5,266,622 A | 11/1993 | Mazanek | |
| 5,288,320 A | 2/1994 | Decelles | |
| 5,318,625 A | 6/1994 | Stramel | |
| 5,362,770 A | 11/1994 | Palmer | |
| 5,397,391 A | 3/1995 | Stramel | |
| 5,567,754 A | 10/1996 | Stramel | |
| 5,643,592 A | 7/1997 | Jacobson | |
| 5,733,365 A | 3/1998 | Halko | |
| 5,830,929 A | 11/1998 | Stramel | |
| 5,837,049 A | 11/1998 | Watson | |
| 5,908,498 A | 6/1999 | Kauffman | |
| 5,910,213 A | 6/1999 | Ashdown | |
| 5,993,536 A * | 11/1999 | Matsui et al. | ............... 106/712 |
| 6,139,617 A | 10/2000 | Halko | |
| 6,544,328 B1 | 4/2003 | Roberts | |
| 6,713,543 B1 | 3/2004 | El-Shoubary | |
| 2003/0029359 A1 | 2/2003 | Marshall | |
| 2006/0048674 A1* | 3/2006 | Craig et al. | ............... 106/35 |
| 2006/0052485 A1* | 3/2006 | Craig | ............... 523/210 |

* cited by examiner

Primary Examiner—Helene Klemanski
(74) Attorney, Agent, or Firm—William B. Miller

(57) ABSTRACT

Inorganic pigments treated with at least one N,N,N-trialkyl quaternary amino acid inner salt possess improved processibility and dispersibility in thermoplastic materials, and impart improved properties to thermoplastic compositions containing said surface-treated pigments.

11 Claims, No Drawings

SURFACE TREATED PIGMENTS

FIELD OF THE INVENTION

This invention relates to inorganic pigments with improved surface treatments. The pigments of this invention are useful as opacifiers and colorants in the manufacture of products produced in many industries, including in coatings and coated goods, in plastics and articles made therefrom, and in paper and paper goods.

BACKGROUND OF THE INVENTION

Inorganic pigments are used as opacifiers and colorants in many industries including the coatings, plastics, and paper industries. In general, the effectiveness of the pigment in such applications depends on how evenly the pigment can be dispersed in a coating, in plastic or in paper. For this reason, pigments are generally handled in the form of a finely divided powder. For example, titanium dioxide, the most widely used white pigment in commerce today due to its ability to confer high opacity when formulated into end-use products, is handled in the form of a finely divided powder in order to maximize the opacifying properties imparted to materials formulated therewith. However, titanium dioxide powders are inherently dusty and frequently exhibit poor powder flow characteristics during the handling of the powder itself, especially during formulation, compounding, and manufacture of end-use products. While free-flowing powders with low dust properties can be obtained through known manufacturing practices, these powders usually exhibit reduced opacifying properties. To this end, chemical modification of titanium dioxide pigment surfaces has been the preferred approach to achieving the desired balance of pigment opacity and flow characteristics.

It is known in the art that the wetting and dispersing properties of titanium dioxide pigments can be improved by exposure to certain inorganic treatments, for example, depositing inorganic metal oxide and/or metal hydroxide coatings on the surface of the titanium dioxide.

Certain other chemical modifications of titanium dioxide pigment surfaces, involving treatment with organic compounds such as certain organic polyols, are also known to improve pigment performance, including helping to reduce the tendency of a pigment to adsorb moisture and to improve its gloss characteristics, particularly in coatings. In thermoplastics, improved pigment dispersion characteristics results in improved thermoplastics processing and uniformity of color. Organic chemical treatment of the pigment surface has also become the preferred method for achieving desired performance enhancements in cosmetics compositions, in paper and in inks, wherein the uniformity of pigment dispersion is critical. The most advantageous chemical composition for surface treatment in general will be dependent on the particular end use to which the titanium dioxide is put.

Thus, in combinations with organic thermoplastics, wherein enhanced thermoplastic stability, optimum thermoplastic surface aesthetics, or higher processing throughput is required, hydrophobic organic compounds have frequently been the surface treatments of choice, due to their known ability to enhance pigment/polymer compatibility and to decrease thermoplastic polymer melt viscosity. Not surprisingly, for the reasons stated above, many patents have been issued disclosing methods for improving titanium dioxide pigments wherein a hydrophobic organic compound is deposited onto the pigment surface prior to its incorporation into such end use materials as plastics as well as in coatings, inks and paper.

U.S. Pat. No. 3,015,573, for example, discloses titanium dioxide pigments having adsorbed thereon a small amount of the water-soluble salt of a tertiary amine with an organic acid of low water solubility, wherein substantially improved dispersibility in surface coating compositions is said to be achieved.

U.S. Pat. No. 3,172,772 discloses a method for improving the gloss properties of titanium dioxide pigments, comprising the treatment of a hydrous oxide treated titanium dioxide with specified levels of either benzoic or para-aminobenzoic acid and an organic amine.

U.S. Pat. No. 3,506,466 discloses a titanium dioxide pigment of either anatase or rutile modification with or without a coating of inorganic substances, which is treated with a salt of a water-soluble alkanolamine and an oxycarboxylic acid and milled in a fluid energy mill to provide improved properties in coating compositions.

U.S. Pat. No. 3,728,142 describes an inorganic pigment such as titanium dioxide which is described as being made more readily dispersible in plastics by coating with an alkyd resin of specified composition.

U.S. Pat. No. 3,754,956 discloses improved wetting and dispersion characteristics of titania pigments in plastics by treating the pigment with from 0.1–60.0 percent by weight of a polylactone having terminal hydroxy groups.

U.S. Pat. No. 3,825,438 discloses a process for coating titanium dioxide pigment with at least one hydrous metal oxide by precipitating, in a slurry process, a hydrous oxide on to the pigment in the presence of an alcohol and/or a carboxylic acid, each of which contains at least two or more hydroxy groups.

U.S. Pat. No. 3,925,095 describes free-flowing dispersible inorganic pigment or filler compositions containing, as dispersion aids, hydroxyalkylated alkylenediamines.

U.S. Pat. No. 3,947,287 discloses stable aqueous pigment dispersions comprising a water-soluble surfactant which is a reaction product of a polyhydroxyl compound with specified amounts of, sequentially, propylene oxide and ethylene oxide per equivalent of hydroxyl.

U.S. Pat. No. 4,056,402 describes water-dispersible dry, non-dusting pigment compositions which develop good strength and color values in waterborne industrial finish systems, wherein the pigment compositions contain specified ratios of pigment, nonionic dispersing agents, and at least one water soluble nonionic cellulose ether.

U.S. Pat. No. 4,127,421 discloses an aqueous process for production of non-dusting granular lead chromate-containing pigments via agitation in the presence of a friable low molecular weight hydrocarbon resin and a cationic surfactant. The granules are useful as colorants for air-drying enamels coating systems and plastics.

U.S. Pat. No. 4,156,616 describes dispersions of inorganic and organic pigments containing an alkylene oxide adduct on long-chain aliphatic amines and an anionic surfactant having an aliphatic radical of 3 to 40 carbon atoms which are readily incorporated into hydrophilic or hydrophobic media, yielding paints of high tinctorial strength and purity of shade.

U.S. Pat. No. 4,235,768 discloses an improved aqueous production process for readily dispersible titanium dioxide pigments comprising the homogeneous coating of a titanium dioxide pigment with an organic carboxyl group-containing polymer. The pigment products are described as dispersing very easily into organic binders.

U.S. Pat. No. 4,375,520 describes a procedure for the densification of particulate materials comprising treatment of particles, including pigments, with a composition comprising a liquid polymeric substance, such as soybean oil, and a solid low molecular weight polymer, such as polyethylene vinyl acetate copolymer, resulting in the production of clean dustless uniform beads.

U.S. Pat. No. 4,375,989 claims a titanium dioxide pigment, comprising a coating of an inorganic substance, the total amount of the inorganic coating, expressed as oxide being at maximum about 0.5% of the weight of the pigment, and further comprising a coating of an organic substance selected from the group comprising large-molecule fatty acids and their salts, organic silicon compounds, such as dimethylpolysiloxane, alcohols and polyalcohols.

U.S. Pat. No. 4,464,203 discloses highly concentrated, dust-free, solid and readily dispersible inorganic or organic pigment formulations containing sequential propylene oxide and ethylene oxide addition products of alkyleneamines which are useful for pigmenting printing inks, surface coatings, and printing pastes for textiles.

U.S. Pat. No. 4,563,221 discloses a particulate titanium dioxide having an organic coating of isostearic acid, dodecylbenzene sulfonic acid and a cationic emulsifying agent of a fatty alkyl amine. After such treatment the pigment does not require milling in a fluid energy mill and is easily dispersible in plastics media.

U.S. Pat. No. 4,599,114 describes the treatment of titanium dioxide and other pigments with a surfactant compound consisting of the reaction product of a diamine, a carboxylic acid, and a fatty acid, to enhance the performance of the pigment in paints, plastics, paper making compositions, and reinforced plastic composite compositions.

U.S. Pat. No. 4,752,340 describes titanium dioxide pigments characterized by improved gloss developing and dispersibility properties in surface coating vehicles and reduced tendencies to adsorb moisture. Said titanium dioxide pigments comprise pigmentary titanium dioxide particles having deposited thereon a treating agent comprising at least one amine salt of a polyprotic acid having pKa1 value greater than about 2.5 and a water solubility at 20° C. of at least 2.0 weight percent and an alkanolamine having a pKb1 greater than about 4.4.

U.S. Pat. No. 4,762,523 claims permanently non-dusting inorganic or organic pigment preparations produced by a process comprising thoroughly mixing a moist press cake of said pigment with from 0.5 to 10% of a long-chain polyester surfactant produced by condensation of at least one saturated or unsaturated aliphatic ω-hydroxycarboxylic acid with at least 4 carbon atoms between the hydroxy group and the carboxy group and a total of at least 9 carbon atoms including the carboxy group or by condensing said at least one hydroxycarboxylic acid with a carboxylic acid lacking hydroxy substitution, then drying said surfactant-containing mixture; adding an essentially non-volatile liquid selected from the group consisting of mineral oil and molten wax to said dried mixture in an amount of 2–25% based on said dried mixture; and applying intensive stress to said liquid-containing mixture until said pigment is wetted by said liquid and the flowable granulate results.

U.S. Pat. No. 4,863,800 discloses a pigment material, the surfaces of which are treated with a saturated fatty acid triglyceride having an iodine value of not more than 5. The treated material, which is used in cosmetics, has strong water repellency, feels smooth, and adheres well to the skin.

U.S. Pat. No. 4,909,853 claims pigment preparations consisting essentially of an organic pigment and/or carbon black and a surfactant selected from the group consisting of sulfosuccinic acid ester series, alkylbenzenesulfonate series and mixtures thereof, which have been dried, after wet comminution, by spray- or freeze-drying from an aqueous medium, and which are useful for pigmenting thermoplastics.

U.S. Pat. No. 4,923,518 discloses chemically inert pigmentary zinc oxide compositions, useful in producing UV light stable polymeric resin compositions and prepared by wet treatment of chemically reactive zinc oxide base pigments. According to this reference, chemically inert organic or inorganic coatings of either a water insoluble metallic soap of a saturated or unsaturated monocarboxylic acid, separate and distinct coatings of at least two different hydrous metal oxides and, optionally, a further encapsulating coating of the water insoluble metallic soap of a saturated or unsaturated monocarboxylic acid, or a coating of a single hydrous metal oxide and an encapsulating coating of the water insoluble metallic soap of a saturated or unsaturated monocarboxylic acid are deposited on the zinc oxide base pigment.

U.S. Pat. No. 4,935,063 discloses inorganic fillers or pigments having simultaneous reinforcing effect and stabilizing effect on organic polymers, obtained by bringing the inorganic filler or pigment into contact with a solution, in an inert organic solvent, of a sterically hindered amine comprising one or more alkoxysilane groups, maintaining mixture at higher than ambient temperature for a period of at least 0.5 hours, removing the solvent, and recovering the stabilizing filler or pigment.

U.S. Pat. No. 4,986,853 discloses lamina-shaped pearlescent pigment preparations of improved flowability, wherein the starting pigments have been coated with preferably 0.2–20% by weight of a saturated monocarboxylic acid having preferably 10–26 carbon atoms or of a cyclohexanone condensate resin.

U.S. Pat. No. 5,228,912 teaches the surface treatment of platelet-shaped pigments, such as mica and metal oxide-coated mica, with a polyacrylate or polymethacrylate and water-soluble salts thereof, for improved dispersibility in printing ink systems.

U.S. Pat. No. 5,260,353 and U.S. Pat. No. 5,362,770 describe a method of increasing the hydrophobicity of solid materials, such as titanium dioxide and other particulate property modifiers, and polymeric compositions containing said hydrophobic particulate property modifiers. The method comprises the steps of: (a) metal ion activating the surface of a solid substrate material to provide reactive metal sites on the surface and (b) chemically bonding a surfactant to the surface at the reactive metal sites.

U.S. Pat. No. 5,266,622 discloses stable aqueous dispersions of fillers and/or pigments, useful as paper coating compounds, which contain a dispersant combination comprising a water-soluble polymer, a non-ionic alkylene oxide adduct, an organosulfonate, sulfate or phosphate, and anionic sulfosuccinate.

U.S. Pat. No. 5,288,320 discloses titanium dioxide carrying on its surface an ester or partial ester of an organic hydroxy compound containing 1 to 6 hydroxy groups and an aliphatic saturated $C_{10}$ to $C_{22}$ monocarboxylic acid, for use in plastic masterbatches.

U.S. Pat. No. 5,567,754 claims pigmentary materials, such as titanium dioxide, having deposited thereon a partial ester polyol and unsaturated monocarboxylic acid treating agent corresponding to the formula R(OH)xCOOR', wherein R is an alkyl or aryl radical containing from about 2 to about 20 carbon atoms, R' is an unsaturated alkyl radical containing from about 6 to about 20 carbon atoms, and x is a number from about 2 to about 6. Such treating agenrs are described as improving the dispersibility of the pigments in thermoplastic resins and enabling the production of thermoplastic concentrates comprising a high percentage of treated inorganic pigment dispersed in a thermoplastic resin.

U.S. Pat. No. 5,643,592 discloses finely-divided particulate additives for polymers with a surface coating comprised of a compound selected from the group consisting of esters of difunctional $C_6$—$C_{40}$ aliphatic and aromatic carboxylic acids and triesters of phosphoric acid. The preferred additive compositions are described as especially useful in the manufacture of synthetic fibers.

U.S. Pat. No. 5,733,365 describes a process for preparing a low-dusting, free-flowing pigment possessing good processibility and dispersibility in plastics concentrates, wherein a monovalent salt of a dialkyl ester of sulfosuccinic acid treating agent is deposited onto said pigment surface.

U.S. Pat. No. 5,830,929 claims thermoplastic concentrates comprising an inorganic pigment dispersed in a thermoplastic resin and having deposited thereon a dialkyl sulfosuccinate treating agent, said dialkyl sulfosuccinate treating agent being deposited in a dry-treating operation without the presence of aqueous metal ions in an amount ranging from about 0.1 percent to about 5 percent by weight.

U.S. Pat. No. 5,908,498 describes a process for preparing a low-dusting, free-flowing pigment possessing good processibility and dispersibility in plastics concentrates, wherein a monovalent salt of a dialkyl ester of sulfosuccinic acid treating agent is deposited onto said pigment surface under a specified set of treatment conditions.

U.S. Pat. No. 5,910,213 discloses a pigmentary material comprising particulate titanium dioxide treated with a polymeric hindered amine stabilizer, and which can be incorporated into a polymeric composition resulting in reduced degradation of the composition. The stabilizing effect of the hindered amine is greater than the effect observed when titanium dioxide and hindered amine stabilizer are separately added to a composition.

U.S. Pat. No. 6,139,617 claims titanium dioxide pigments which exhibit improved gloss developing and dispersibility properties in surface coating vehicles and reduced dispersant requirements, said pigments comprising pigmentary titanium dioxide particles having deposited thereon a treating agent comprising the reaction product of at least one monoprotic acid selected from the group consisting of dimethylolpropionic acid and dimethylolbutanoic acid and an amine.

U.S. Pat. No. 6,544,328 describes a process for preparing an improved pigment which is readily dispersible in paints and plastics concentrates, using specific surface active agents to coat the pigment. Preferred surface active agents are ethoxylated sorbitan derivatives and non-ethoxylated or ethoxylated mono- and diglycerides.

U.S. Patent Application Publication No. U.S. 2003/0029359 A1 describes improved particulate inorganic pigments and processes for preparing such inorganic pigments, which have enhanced dispersibility in plastic materials. The processes comprise coating the particulate inorganic pigment with a complex mixture of partially and totally polysaturated and unsaturated fatty acid esters and derivatives thereof.

In addition, many treatments are disclosed of inorganic fillers or pigments with organophosphorus compounds. U.S. Pat. No. 4,183,843, for instance, discloses an improved process for dispersing inorganic fillers in a polyester resin wherein the improvement comprises coating the filler with 0.05 to 1.0 percent, based on weight of the filler, of a polar phosphate ester surfactant containing acid groups and polar ether groups.

U.S. Pat. No. 4,186,028 describes improved fluid aqueous pigment dispersions, including titanium dioxide dispersions, using a phosphonocarboxylic acid or salt thereof as a dispersion aid.

U.S. Pat. No. 4,209,430 discloses improved inorganic pigments, such as pigmentary titanium dioxide, made by treating such pigments with a treating agent comprising the reaction product of a phosphorylating agent and a polyene. The treated pigments are useful in thermoplastic formulations and provide the additional benefit of suppressing yellowing in thermoplastic polyolefins containing a phenolic antioxidant and titanium dioxide.

U.S. Pat. No. 4,357,170 and U.S. Pat. No. 4,377,417 disclose titanium dioxide pigments treated to suppress yellowing in polymers, the treating composition comprising an organophosphate/alkanolamine addition product or a combination of an organophosphate/alkanolamine addition product and a polyol, respectively.

U.S. Pat. No. 5,318,625 and U.S. Pat. No. 5,397,391 disclose, respectively, thermoplastic pigment concentrates and pigments of improved dispersibility in thermoplastic resins, wherein an inorganic pigment such as titanium dioxide has an organophosphate triester treatment deposited thereon.

U.S. Pat. No. 5,837,049 describes a pigment, extender or filler, the particles of which are coated with an alkylphosphonic acid or ester thereof. The treated inorganic solid is particularly useful for preparing polymer compositions such as masterbatches.

U.S. Pat. No. 6,713,543 describes a unique treatment for pigments which uses certain organo-phosphoric acids and/or their salts, resulting in improved physical and chemical qualities, including lacing resistance, improved dispersion and decreased chemical reactivity when these treated pigments are incorporated into polymeric matrices.

Despite all the work and effort documented in the prior art relating to the development of improved organic treatments for pigments, further improvements are continually being sought. In none of the aforementioned references are pigment surface treatments described which would anticipate the advantages achieved according to the instant invention, specifics of which are provided below.

SUMMARY OF THE PRESENT INVENTION

It has been discovered that inorganic pigments having deposited on the pigment surface at least one N,N,N-trialkyl quaternary amino acid inner salt possess improved processibility and dispersibility in thermoplastic materials, and impart improved properties to thermoplastic compositions containing said surface-treated pigments.

DETAILED DESCRIPTION OF PREFERRED EMBODIMENTS OF THE PRESENT INVENTION

The N,N,N-trialkyl quaternary amino acid inner salts contemplated by the instant invention comprise especially those salts wherein at least one alkyl group contains from six to twenty-four carbon atoms, the amino acid moiety contains at least two up to twelve carbon atoms and the acid functionality is of the carboxylic or sulfonic acid type.

More preferred are the N,N,N-trialkyl quaternary amino acid inner salts wherein at least one alkyl group contains from eight to twenty carbon atoms, the amino acid moiety contains from two to six carbon atoms and the acid functionality is of the carboxylic or sulfonic acid type. Most preferred are the N,N,N-trialkyl quaternary amino acid inner salts wherein at least one alkyl group contains from twelve to eighteen carbon atoms, the amino acid moiety contains from two to four carbon atoms and the acid functionality is of the carboxylic or sulfonic acid type. Exemplary salts include N-lauryl-N,N-dimethylaminomethane carboxylate inner salt, also known as N-laurylbetaine, and 3-(N-lauryl-N,N-dimethylamino)propane sulfonate inner salt, also known as N-laurylsulfobetaine. Also contemplated are mixtures of one or more of these salts, and combinations of 50% by weight or greater of any of the various aforementioned salts with other organic surface treatment materials known in the art for imparting improved processibility and performance properties to pigments in accordance with the instant invention.

The amount of one or more N,N,N-trialkyl quaternary amino acid inner salts added as a surface treatment according to the instant invention will be an amount of such materials sufficient to provide a treated inorganic particulate-containing thermoplastic resin with improved processing properties over that of a thermoplastic resin composition derived from the corresponding untreated inorganic particulate, preferably being incorporated on the inorganic particulate in an amount ranging from about 0.1 to about 5 weight percent of such materials, more preferably being incorporated at from about 0.25 to about 2.5 percent and most preferably being employed at from about 0.5 to about 1.5 percent by weight, based on the weight of the inorganic particulate.

The pigment surface treatments identified by the present invention can be accomplished using any of the known methods of treating pigment surfaces, such as deposition in a fluid energy mill, applying the treating agent to the dry pigment by mixing or spraying, or through the drying of pigment slurries containing said treating agent.

Inorganic pigments improved by the instant invention, and which can also be referred to as fillers, extenders or reinforcing pigments, include any of the particulate inorganic pigments known in the surface coatings and plastics industries. Examples include white opacifying pigments such as titanium dioxide, basic carbonate white lead, basic sulfate white lead, basic silicate white lead, zinc sulfide, zinc oxide; composite pigments of zinc sulfide and barium sulfate, antimony oxide and the like; white extender pigments such as calcium carbonate, calcium sulfate, china and kaolin clays, mica, diatomaceous earth; and colored pigments such as iron oxide, lead oxide, cadmium sulfide, cadmium selenide, lead chromate, zinc chromate, nickel titanate and chromium oxide. Most preferred is titanium dioxide of either the anatase or rutile crystalline structure or some combination thereof. The titanium dioxide pigment can have deposited thereon any of the inorganic metal oxide and/or metal hydroxide surface coatings known to the art, prior to treatment with the amino acid inner salt treating materials according to the instant invention.

Thermoplastic compositions which possess improved properties with respect to polymer processing and end-use applications when formulated with the treated pigments of the instant invention comprise polyolefins such as polyethylene and polypropylene, acrylic resins such as polymethylmethacrylate, polyester resins such as polyethylene or polybutylene terephthalate, polyamide resins, styrenic resins such as acrylonitrile-butadiene-styrene copolymer, poly(vinylchloride), polycarbonate resins and their various copolymers and alloys.

The following examples serve to illustrate specific embodiments of the instant invention without intending to impose any limitations or restrictions thereto. Concentrations and percentages are by weight unless otherwise indicated.

ILLUSTRATIVE EXAMPLES

Example 1

Particulate titanium dioxide pigment intermediate obtained from the vapor phase oxidation of titanium tetrachloride and containing 0.8% alumina in its crystalline lattice, was dispersed in water in the presence of 0.18% by weight (based on the pigment) of sodium hexametaphosphate dispersant and with sodium hydroxide sufficient to adjust the pH of the dispersion to a minimum value of 9.5, to provide an aqueous dispersion having a solids content of 35% by weight. The resulting titanium dioxide slurry was sand milled, using a zircon sand-to-pigment weight ratio of 4 to 1, until a volume average particle size was achieved wherein greater than 90% of the particles were smaller than 0.63 microns, as determined utilizing a Microtrac X100 Particle Size Analyzer (Microtrac Inc. Montgomeryville, Pa.). The slurry was heated to 60° C., acidified to a pH of 2.0 using concentrated sulfuric acid, then allowed to digest at 60° C. for 30 minutes. After this, adjustment of the pigment slurry pH to a value of 6.2 using 20% by weight aqueous sodium hydroxide solution was followed by digestion for an additional 30 minutes at 60° C., with final readjustment of the pH to 6.2, if necessary, at which point the dispersion was filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer (Invensys APV Silkeborg, Denmark), maintaining a dryer inlet temperature of approximately 280° C., to yield a dry pigment powder.

One thousand (1000) grams of the resulting pigment powder were thoroughly mixed with ten (10) grams of N-lauryl-N,N-dimethylaminomethane carboxylate inner salt to achieve a pigment surface coating concentration of 1% by weight, based on titanium dioxide. The dry powder mixture was subsequently roll milled for sixteen hours at room temperature, after which time the powder mixture was steam micronized, utilizing a steam to pigment weight ratio of five, with a steam injector pressure set at 146 psi and micronizer ring pressure set at 118 psi.

The resulting treated pigment sample was evaluated in titanium dioxide/polyethylene concentrates, according to the following procedure:

One hundred and nine and one-half (109.5) grams of the pigment was mixed with thirty-six and one-half (36.5) grams of Dow 4012 low density polyethylene, a product of The Dow Chemical Co., and 0.05% by weight based on polyethylene of an 80/20 mixture of tris(2,4-di-tertbutylphenyl)phosphite and octadecyl-3-(3,5-di-tertbutyl-4-hydroxyphenyl)propionate, to prepare a 75% by weight titanium dioxide-containing polyethylene concentrate via mastication of the mixture in the mixing bowl of a Plasticorder Model PL-2000 (C. W. Brabender Instruments, Inc. South Hackensack, N.J.) at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 1.

The same procedure was repeated using titanium dioxide produced according to the procedure outlined above but omitting the treatment with the N-lauryl-N,N-dimethylaminomethane carboxylate inner salt (Comparative Example 1).

TABLE 1

Processing Behavior of Titanium Dioxide-Containing Polyethylene Concentrates

| Pigment Sample: | Melt Flow Index (g/10 minutes: 190 C) | Equilibrium Torque (meter-grams) | Max. Extruder Pressure (psi) |
| --- | --- | --- | --- |
| Example 1 | 6 | 940 | 520 |
| Comp. Ex. 1 | <1 | 1290 | 835 |

The surface treated titanium dioxide produced according to the present invention and having no inorganic surface treatment coating thus demonstrates improved processibility and dispersibility, as indicated by the higher melt flow index value, the lower equilibrium torque value, and the lower maximum extruder processing pressure observed for the concentrate produced with the N-lauryl-N,N-dimethylaminomethane carboxylate inner salt treated pigment versus the comparative example.

Example 2

Particulate titanium dioxide pigment intermediate obtained from the vapor phase oxidation of titanium tetrachloride and containing 0.8% alumina in its crystalline lattice was dispersed in water in the presence of 0.18% by weight (based on pigment) of sodium hexametaphosphate dispersant, along with sufficient sodium hydroxide to adjust the pH of the dispersion to a minimum value of 9.5, to yield an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 60° C., acidified to a pH of 2.0 using concentrated sulfuric acid, then treated with 1% alumina added as a 357 gram/liter aqueous sodium aluminate solution. During the addition of the sodium aluminate solution, the pH of the slurry was maintained between a value of 8.0 and 8.5 via the addition of sulfuric acid, prior to digestion for 15 minutes at 60° C. After this, the slurry pH was adjusted to a pH of 6.2 with additional sulfuric acid, followed by digestion for an additional 15 minutes at 60° C., followed by a final adjustment of the slurry pH to 6.2. The dispersion was filtered while hot, and the filtrate washed with an amount of 60° C., pH 7.0 water equal in weight to the recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer, maintaining a dryer inlet temperature of approximately 280° C., to yield a dry pigment powder.

One thousand (1000) grams of the resulting pigment powder were thoroughly mixed with ten (10) grams of N-lauryl-N,N-dimethylaminomethane carboxylate inner salt to achieve a pigment surface coating concentration of 1% by weight based on titanium dioxide. The dry powder mixture was subsequently roll milled for sixteen hours at room temperature, after which time the powder mixture was steam micronized at a steam to pigment weight ratio of five, with a steam injector pressure set at 146 psi and micronizer ring pressure set at 118 psi.

The resulting finished pigment sample was evaluated in titanium dioxide/polyethylene concentrates, according to the following procedure:

One hundred and nine and one-half (109.5) grams of the finished pigment described above was mixed with thirty-six and one-half (36.5) grams of Dow 4012 low density polyethylene, a product of The Dow Chemical Company, and 0.05% by weight based on polyethylene of an 80/20 mixture of tris(2,4-di-tertbutylphenyl)phosphite and octadecyl-3-(3, 5-di-tertbutyl-4-hydroxyphenyl)propionate, to prepare a 75% by weight titanium dioxide-containing polyethylene concentrate via mastication of the mixture in the mixing bowl of a Brabender Plasticorder Model PL-2000 at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 2.

The same procedure was repeated using titanium dioxide produced according to the procedure outlined above but omitting the treatment with N-lauryl-N,N-dimethylaminomethane carboxylate inner salt (Comparative Example 2).

TABLE 2

Processing Behavior of Titanium Dioxide Containing Polyethylene Concentrates

| Pigment Sample: | Melt Flow Index (g/10 minutes: 190 C) | Equilibrium Torque (meter-grams) | Max. Extruder Pressure (psi) |
|---|---|---|---|
| Example 2 | <1 | 1250 | 810 |
| Comp. Example 2 | <1 | 1360 | 1075 |

The surface treated titanium dioxide produced according to the present invention and having deposited thereon an inorganic coating of 1% by weight of the pigment of alumina thus likewise demonstrates improved processibility and dispersibility, as indicated by the lower equilibrium torque value and the lower maximum extruder processing pressure observed for the concentrate produced with the N-lauryl-N,N-dimethylaminomethane carboxylate inner salt treated pigment versus the comparative example.

Example 3

Particulate titanium dioxide pigment intermediate obtained from the vapor phase oxidation of titanium tetrachloride and containing 0.8% alumina in its crystalline lattice, was dispersed in water in the presence of 0.18% by weight (based on the pigment) of sodium hexametaphosphate dispersant and with sodium hydroxide sufficient to adjust the pH of the dispersion to a minimum value of 9.5, to provide an aqueous dispersion having a solids content of 35% by weight. The resulting titanium dioxide slurry was sand milled, using a zircon sand-to-pigment weight ratio of 4 to 1, until a volume average particle size was achieved wherein greater than 90% of the particles were smaller than 0.63 microns, as determined utilizing a Microtrac X100 Particle Size Analyzer. The slurry was heated to 60° C., acidified to a pH of 2.0 using concentrated sulfuric acid, then allowed to digest at 60° C. for 30 minutes. After this, adjustment of the pigment slurry pH to a value of 6.2 using 20% by weight aqueous sodium hydroxide solution was followed by digestion for an additional 30 minutes at 60° C., with final readjustment of the pH to 6.2, if necessary, at which point the dispersion was filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer, maintaining a dryer inlet temperature of approximately 280° C., to yield a dry pigment powder.

One thousand (1000) grams of the resulting pigment powder were thoroughly mixed with ten (10) grams of 3-(N-lauryl-N,N-dimethylamino)propane sulfonate inner salt to achieve a pigment surface coating concentration of 1% by weight, based on titanium dioxide. The dry powder mixture was subsequently roll milled for sixteen hours at room temperature, after which time the powder mixture was steam micronized, utilizing a steam to pigment weight ratio of five, with a steam injector pressure set at 146 psi and micronizer ring pressure set at 118 psi.

The resulting treated pigment sample was evaluated in titanium dioxide/polyethylene concentrates, according to the following procedure:

One hundred and nine and one-half (109.5) grams of the pigment was mixed with thirty-six and one-half (36.5) grams of Dow 4012 low density polyethylene, a product of The Dow Chemical Co., and 0.05% by weight based on polyethylene of an 80/20 mixture of tris(2,4-di-tertbutylphenyl)phosphite and octadecyl-3-(3,5-di-tertbutyl-4-hydroxyphenyl)propionate, to prepare a 75% by weight titanium dioxide-containing polyethylene concentrate via mastication of the mixture in the mixing bowl of a Plasticorder Model PL-2000 at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 3.

The same procedure was repeated using titanium dioxide produced according to the procedure outlined above but omitting the treatment with the 3-(N-lauryl-N,N-dimethylamino)propane sulfonate inner salt (Comparative Example 3).

TABLE 3

Processing Behavior of Titanium Dioxide-Containing Polyethylene Concentrates

| Pigment Sample: | Melt Flow Index (g/10 minutes: 190 C) | Equilibrium Torque (meter-grams) | Max. Extruder Pressure (psi) |
|---|---|---|---|
| Example 3 | 3 | 1000 | 570 |
| Comp. Ex. 3 | <1 | 1290 | 835 |

The surface treated titanium dioxide produced according to the present invention and having no inorganic surface treatment coating thus demonstrates improved processibility and dispersibility, as indicated by the higher melt flow index value, the lower equilibrium torque value, and the lower maximum extruder processing pressure observed for the concentrate produced with the 3-(N-lauryl-N,N-dimethylamino)propane sulfonate inner salt treated pigment versus the comparative example.

Example 4

Particulate titanium dioxide pigment intermediate obtained from the vapor phase oxidation of titanium tetrachloride and containing 0.8% alumina in its crystalline lattice was dispersed in water in the presence of 0.18% by weight (based on pigment) of sodium hexametaphosphate dispersant, along with sufficient sodium hydroxide to adjust the pH of the dispersion to a minimum value of 9.5, to yield an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 60° C., acidified to a pH of 2.0 using concentrated sulfuric acid, then treated with 1% alumina added as a 357 gram/liter aqueous sodium aluminate solution. During the addition of the sodium aluminate solution, the pH of the slurry was maintained between a value of 8.0 and 8.5 via the addition of sulfuric acid, prior to digestion for 15 minutes at 60° C. After this, the slurry pH was adjusted to a pH of 6.2 with additional sulfuric acid, followed by digestion for an additional 15 minutes at 60° C., followed by a final adjustment of the slurry pH to 6.2. The dispersion was filtered while hot, and the filtrate washed with an amount of 60° C., pH 7.0 water equal in weight to the recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer, maintaining a dryer inlet temperature of approximately 280° C., to yield a dry pigment powder.

One thousand (1000) grams of the resulting pigment powder were thoroughly mixed with ten (10) grams of 3-(N-lauryl-N,N-dimethylamino)propane sulfonate inner salt to achieve a pigment surface coating concentration of 1% by weight based on titanium dioxide. The dry powder mixture was subsequently roll milled for sixteen hours at room temperature, after which time the powder mixture was steam micronized at a steam to pigment weight ratio of five, with a steam injector pressure set at 146 psi and micronizer ring pressure set at 118 psi.

The resulting finished pigment sample was evaluated in titanium dioxide/polyethylene concentrates, according to the following procedure:

One hundred and nine and one-half (109.5) grams of the finished pigment described above was mixed with thirty-six and one-half (36.5) grams of Dow 4012 low density polyethylene, a product of The Dow Chemical Company, and 0.05% by weight based on polyethylene of an 80/20 mixture of tris(2,4-di-tertbutylphenyl)phosphite and octadecyl-3-(3,5-di-tertbutyl-4-hydroxyphenyl)propionate, to prepare a 75% by weight titanium dioxide-containing polyethylene concentrate via mastication of the mixture in the mixing bowl of a Brabender Plasticorder Model PL-2000 at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 4.

The same procedure was repeated using titanium dioxide produced according to the procedure outlined above but omitting the treatment with 3-(N-lauryl-N,N-dimethylamino)propane sulfonate inner salt (Comparative Example 4).

TABLE 4

Processing Behavior of Titanium Dioxide Containing Polyethylene Concentrates

| Pigment Sample: | Melt Flow Index (g/10 minutes: 190 C) | Equilibrium Torque (meter-grams) | Max. Extruder Pressure (psi) |
|---|---|---|---|
| Example 4 | <1 | 1310 | 790 |
| Comp. Example 4 | <1 | 1360 | 1075 |

The surface treated titanium dioxide produced according to the present invention and having deposited thereon an inorganic coating of 1% by weight of the pigment of alumina thus likewise demonstrates improved processability and dispersibility, as indicated by the lower equilibrium torque value and the lower maximum extruder processing pressure observed for the concentrate produced with the 3-(N-lauryl-N,N-dimethylamino)propane sulfonate inner salt treated pigment versus the comparative example.

Example 5

Particulate titanium dioxide pigment intermediate obtained from the vapor phase oxidation of titanium tetrachloride and containing 0.8% alumina in its crystalline lattice, was dispersed in water in the presence of 0.18% by weight (based on the pigment) of sodium hexametaphosphate dispersant and with sodium hydroxide sufficient to adjust the pH of the dispersion to a minimum value of 9.5, to provide an aqueous dispersion having a solids content of 35% by weight. The resulting titanium dioxide slurry was sand milled, using a zircon sand-to-pigment weight ratio of 4 to 1, until a volume average particle size was achieved wherein greater than 90% of the particles were smaller than 0.63 microns, as determined utilizing a Microtrac X100 Particle Size Analyzer. The slurry was heated to 60° C., acidified to a pH of 2.0 using concentrated sulfuric acid, then allowed to digest at 60° C. for 30 minutes. After this, adjustment of the pigment slurry pH to a value of 6.2 using 20% by weight aqueous sodium hydroxide solution was followed by digestion for an additional 30 minutes at 60° C., with final readjustment of the pH to 6.2, if necessary, at which point the dispersion was filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer, maintaining a dryer inlet temperature of approximately 280° C., to yield a dry pigment powder.

One thousand (1000) grams of the resulting pigment powder were thoroughly mixed with ten (10) grams of N-cetyl-N,N-dimethylaminomethane carboxylate inner salt to achieve a pigment surface coating concentration of 1% by weight, based on titanium dioxide. The dry powder mixture was subsequently roll milled for sixteen hours at room temperature, after which time the powder mixture was steam micronized, utilizing a steam to pigment weight ratio of five, with a steam injector pressure set at 146 psi and micronizer ring pressure set at 118 psi.

The resulting treated pigment sample was evaluated in titanium dioxide/polyethylene concentrates, according to the following procedure:

One hundred and nine and one-half (109.5) grams of the pigment was mixed with thirty-six and one-half (36.5) grams of Dow 4012 low density polyethylene, a product of The Dow Chemical Co., and 0.05% by weight based on polyethylene of an 80/20 mixture of tris(2,4-di-tertbutylphenyl)phosphite and octadecyl-3-(3,5-di-tertbutyl-4-hydroxyphenyl)propionate, to prepare a 75% by weight titanium dioxide-containing polyethylene concentrate via mastication of the mixture in the mixing bowl of a Plasticorder Model PL-2000 at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 5.

The same procedure was repeated using titanium dioxide produced according to the procedure outlined above but omitting the treatment with the N-cetyl-N,N-dimethylaminomethane carboxylate inner salt (Comparative Example 5).

TABLE 5

Processing Behavior of Titanium Dioxide-Containing Polyethylene Concentrates

| Pigment Sample: | Melt Flow Index (g/10 minutes: 190 C) | Equilibrium Torque (meter-grams) | Max. Extruder Pressure (psi) |
|---|---|---|---|
| Example 5 | 8 | 975 | 520 |
| Comp. Ex. 5 | <1 | 1290 | 835 |

The surface treated titanium dioxide produced according to the present invention and having no inorganic surface treatment coating thus demonstrates improved processibility and dispersibility, as indicated by the higher melt flow index value, the lower equilibrium torque value, and the lower maximum extruder processing pressure observed for the concentrate produced with the N-cetyl-N,N-trimethylaminomethane carboxylate inner salt treated pigment versus the comparative example.

Example 6

Particulate titanium dioxide pigment intermediate obtained from the vapor phase oxidation of titanium tetrachloride and containing 0.8% alumina in its crystalline lattice was dispersed in water in the presence of 0.18% by weight (based on pigment) of sodium hexametaphosphate dispersant, along with sufficient sodium hydroxide to adjust the pH of the dispersion to a minimum value of 9.5, to yield an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 60° C., acidified to a pH of 2.0 using concentrated sulfuric acid, then treated with 1% alumina added as a 357 gram/liter aqueous sodium aluminate solution. During the addition of the sodium aluminate solution, the pH of the slurry was maintained between a value of 8.0 and 8.5 via the addition of sulfuric acid, prior to digestion for 15 minutes at 60° C. After this, the slurry pH was adjusted to a pH of 6.2 with additional sulfuric acid, followed by digestion for an additional 15 minutes at 60° C., followed by a final adjustment of the slurry pH to 6.2. The dispersion was filtered while hot, and the filtrate washed with an amount of 60° C., pH 7.0 water equal in weight to the recovered pigment. The washed filtrate was subsequently re-dispersed in water with agitation, in the presence of 0.35% by weight based on pigment of trimethylol propane, to achieve a concentration of less than 40% by weight of dispersed pigment. The resulting pigment dispersion was spray dried using an APV Nordic PSD52 Spray Dryer, maintaining a dryer inlet temperature of approximately 280° C., to yield a dry pigment powder.

One thousand (1000) grams of the resulting pigment powder were thoroughly mixed with ten (10) grams of N-cetyl-N,N-dimethylaminomethane carboxylate inner salt to achieve a pigment surface coating concentration of 1% by weight based on titanium dioxide. The dry powder mixture was subsequently roll milled for sixteen hours at room temperature, after which time the powder mixture was steam micronized at a steam to pigment weight ratio of five, with a steam injector pressure set at 146 psi and micronizer ring pressure set at 118 psi.

The resulting finished pigment sample was evaluated in titanium dioxide/polyethylene concentrates, according to the following procedure:

One hundred and nine and one-half (109.5) grams of the finished pigment described above was mixed with thirty-six and one-half (36.5) grams of Dow 4012 low density polyethylene, a product of The Dow Chemical Company, and 0.05% by weight based on polyethylene of an 80/20 mixture of tris(2,4-di-tertbutylphenyl)phosphite and octadecyl-3-(3, 5-di-tertbutyl-4-hydroxyphenyl)propionate, to prepare a 75% by weight titanium dioxide-containing polyethylene concentrate via mastication of the mixture in the mixing bowl of a Brabender Plasticorder Model PL-2000 at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 6.

The same procedure was repeated using titanium dioxide produced according to the procedure outlined above but omitting the treatment with N-cetyl-N,N-dimethylaminomethane carboxylate inner salt. (Comparative Example 6).

TABLE 6

Processing Behavior of Titanium Dioxide Containing Polyethylene Concentrates

| Pigment Sample: | Melt Flow Index (g/10 minutes: 190 C) | Equilibrium Torque (meter-grams) | Max. Extruder Pressure (psi) |
|---|---|---|---|
| Example 6 | 3 | 1220 | 635 |
| Comp. Example 6 | <1 | 1360 | 1075 |

The surface treated titanium dioxide produced according to the present invention and having deposited thereon an inorganic coating of 1% by weight of the pigment of alumina thus again demonstrates improved processability and dispersibility, as indicated by the higher melt flow index, the lower equilibrium torque and lower maximum extruder processing pressure observed for the concentrate produced with the N-cetyl-N,N-dimethylaminomethane carboxylate inner salt treated pigment versus the comparative example.

What is claimed is:

1. A finished inorganic pigment of a type suited for incorporation in a thermoplastic concentrate, having deposited on its surface at least one N,N,N-trialkyl quaternary amino acid inner salt and being of a size such that a thermoplastic concentrate including the finished inorganic pigment may be extruded through a 500 mesh, 25 micron opening screen.

2. A pigment as defined in claim 1, having deposited on its surface at least one N,N,N-trialkyl quaternary amino acid inner salt wherein at least one of the alkyl groups contains from six to twenty-four carbon atoms, the amino acid moiety contains at least two up to twelve carbon atoms and the acid functionality is of the carboxylic or sulfonic type.

3. A pigment as defined in claim 2, having deposited on its surface at least one N,N,N-trialkyl quaternary amino acid inner salt wherein at least one of the alkyl groups contains from eight to twenty carbon atoms, the amino acid moiety contains two to six carbon atoms and the acid functionality is of the carboxylic or sulfonic type.

4. A pigment as defined in claim 3, having deposited on its surface at least one N,N,N-trialkyl quaternary amino acid inner salt wherein at least one of the alkyl groups contains from twelve to eighteen carbon atoms, the amino acid moiety contains two to four carbon atoms and the acid functionality is of the carboxylic or sulfonic type.

5. A pigment as defined in claim 1, having deposited on its surface one or more of N-lauryl-N,N-dimethylaminomethane carboxylate inner salt, 3-(N-lauryl-N,N-dimethylamino) propane sulfonate inner salt and N-cetyl-N,N-dimethylaminomethane carboxylate inner salt.

6. A pigment as defined in claim 1, wherein the one or more N,N,N-trialkyl quaternary amino acid inner salts are deposited on the pigment's surface in an amount collectively of from about 0.1 to about 5 percent of the weight of the pigment.

7. A pigment as defined in claim 6, wherein the one or more N,N,N-trialkyl quaternary amino acid inner salts collectively comprise from about 0.25 to about 2.5 percent of the weight of the pigment.

8. A pigment as defined in claim 7, wherein the one or more N,N,N-trialkyl quaternary amino acid inner salts comprise from about 0.5 to about 1.5 percent of the weight of the pigment.

9. A pigment as defined in claim 8, wherein the inorganic pigment including the surface treatment is titanium dioxide.

10. A pigment as defined in claim 1, wherein the inorganic pigment including the surface treatment is titanium dioxide.

11. Titanium dioxide as defined in claim 10, bearing a coating of an inorganic oxide applied to the titanium dioxide prior to the surface treatment.

* * * * *